(12) United States Patent
Kramb et al.

(10) Patent No.: US 10,723,049 B2
(45) Date of Patent: Jul. 28, 2020

(54) POLYOLEFIN COMPATIBILIZER COMPOSITION FOR COMPOUNDING TO IMPROVE STIFFNESS AND IMPACT BALANCE

(71) Applicant: EQUISTAR CHEMICALS, LP, Houston, TX (US)

(72) Inventors: Ryan Kramb, Monroe, OH (US); Jeanine A. Smith, Maineville, OH (US); Fabio Ceccarani, Youngstown, OH (US)

(73) Assignee: Equistar Chemicals, LP, Houston, TX (US)

( * ) Notice: Subject to any disclaimer, the term of this patent is extended or adjusted under 35 U.S.C. 154(b) by 349 days.

(21) Appl. No.: 15/648,816

(22) Filed: Jul. 13, 2017

(65) Prior Publication Data

US 2018/0015647 A1  Jan. 18, 2018

Related U.S. Application Data

(60) Provisional application No. 62/363,704, filed on Jul. 18, 2016.

(51) Int. Cl.
| | | |
|---|---|---|
| *B29C 45/00* | (2006.01) | |
| *C08L 23/16* | (2006.01) | |
| *C08L 23/14* | (2006.01) | |
| *C08L 23/12* | (2006.01) | |
| *B29K 101/12* | (2006.01) | |

(52) U.S. Cl.
CPC .......... *B29C 45/0001* (2013.01); *C08L 23/12* (2013.01); *C08L 23/142* (2013.01); *C08L 23/16* (2013.01); *B29K 2101/12* (2013.01); *C08L 2205/025* (2013.01); *C08L 2205/03* (2013.01); *C08L 2205/06* (2013.01); *C08L 2205/08* (2013.01); *C08L 2310/00* (2013.01)

(58) Field of Classification Search
None
See application file for complete search history.

(56) References Cited

FOREIGN PATENT DOCUMENTS

| WO | WO-9965982 A1 | 12/1999 |
|---|---|---|
| WO | WO-2010108866 A1 | 9/2010 |
| WO | WO-2015169690 A1 | 11/2015 |

OTHER PUBLICATIONS

International Search Report and Written Opinion dated Sep. 20, 2017 (Sep. 20, 2017) for Corresponding PCT/US2017/041950.

*Primary Examiner* — Monica A Huson (57) ABSTRACT

This disclosure provides for compatibilizer compositions that are useful in compounding polypropylenes and ethylene elastomeric copolymers for injection molding applications. The compatibilizer includes a combination of: Component A of polypropylene homopolymers or polypropylene copolymers containing small amounts of ethylene; and Component B of propylene bipolymers with ethylene and/or other α-olefin comonomers, the bipolymer having a relatively high proportion of propylene moieties, for example, 50-75% propylene. Compared to known or conventional compatibilizer formulations, the bipolymer Component B is relatively propylene rich and generally can be used in the injection molding composition in lower concentrations.

17 Claims, 1 Drawing Sheet

POLYOLEFIN COMPATIBILIZER COMPOSITION FOR COMPOUNDING TO IMPROVE STIFFNESS AND IMPACT BALANCE

CROSS REFERENCE TO RELATED APPLICATIONS

This application claims the benefit of priority to U.S. Provisional Application No. 62/363,704, filed Jul. 18, 2016, the contents of which are incorporated herein by reference in their entirety.

TECHNICAL FIELD

This disclosure relates to compatibilizer compositions that are useful in compounding polypropylenes and ethylene-based copolymers for injection molding applications.

BACKGROUND OF THE INVENTION

Polypropylene and polyethylene have enjoyed wide commercial success because of their outstanding performance and cost characteristics. Because of their impact resistance and ability to withstand weather extremes, blends of polypropylene and ethylene-α-olefin copolymer elastomers and plastomers have found particular use in injection molded structures such as automobile bumpers and fascias, interior panels, and other parts.

Relatively large parts such as automobile bumpers present particular challenges in their fabrication and in the ability to impart the necessary stiffness and impact balance to the particular injection molded part. For example, the ability to tailor the desired stiffness/impact balance to a compound and its injection molded part may require the use of "compatibilizers" between the polypropylene and the ethylene-based copolymers used in the compound formulations. Other injection molding issues such as cold flow, tiger striping and gel formation must also be addressed, which also may require various additives. For example, small dots or "gels" may appear at the surface of the final shaped article due to poor dispersion of the polymeric components. However, polyolefin compositions that have been developed to reduce cold flow, tiger striping and gel problems are often not suitable as compatibilizers for delivering improved or enhanced stiffness and impact balance.

Therefore, there is a continuing need for new or improved polyolefin compositions that can be blended or combined with various other polyolefin materials, to provide final compounds exhibiting a good balance of physical and surface properties. It would be advantageous if the new polyolefin compositions could be used as a compatibilizer that could be added to a wide variety of polyolefin compounds that are ready for an injection molding process. This unfulfilled need includes the need for associated methods that relate to the preparation and use of any new compositions that can impart a balance of good physical and surface properties to the final compound.

SUMMARY OF THE INVENTION

This disclosure provides for a polyolefin compatibilizer composition which can be used to prepare a polyolefin compound suitable for injection molding into articles of any shape and size, and especially into relatively large articles. In some embodiments, the polyolefin compound can be injection molded into large objects which exhibit improved mechanical properties, particularly high flex modulus and high impact strength without surface defects or gels. Therefore, the new compatibilizer composition imparted unexpected enhancements in both stiffness and impact strength and appearance to the injection molded part.

This disclosure further describes the compatibilizer composition as consisting of two main components, Components A and B. For clarity, the polypropylene homopolymer or polypropylene copolymer component is referred to generally as Component A, which can include small amounts of ethylene or a $C_4$-$C_{10}$ α-olefin comonomer. The second component is referred to generally as Component B, or as the bipolymer or the propylene bipolymer component, which includes propylene and a larger weight fraction of ethylene or $C_4$-$C_{10}$ α-olefin comonomer than Component A. In certain embodiments, the present combination of polypropylene homopolymers or copolymers (Component A) combined with bipolymers (Component B) are useful as compatibilizer compositions between a polypropylene homopolymer and/or impact copolymer and ethylene-based plastomers and elastomers used for injection molded parts. Also for clarity, the term "composition" generally refers to the compatibilizer composition, whereas the term "compound" generally refers to combination of the compatibilizer composition, the polypropylene and plastomer polymers to be compatibilized, and any additional components such as process aids, antioxidants, and the like.

As compared to known or conventional compositions used in this manner, the polypropylene bipolymer component (Component B) of the compatibilizer compositions is relatively propylene rich, for example, Component B can contain from about 50 wt % to about 75 wt % of propylene, with the balance being ethylene and/or at least one $C_4$-$C_{10}$ α-olefin comonomer (unless otherwise specified, all percentages are by weight.) Ethylene is particularly useful as a comonomer. Further, Component B also differs from the corresponding bipolymer in many known or conventional compositions. In some embodiments, Component B also has a molecular weight that is high enough to achieve good compatibilization yet low enough to reduce gel formation. The molecular weight of the bipolymer component may be assessed by the intrinsic viscosity of the portion of the polymer that is soluble in xylene at room temperature (XSIV). Therefore, in order to achieve good compatibilization and few gels, the XSIV can be between about 4 to about 7.5 dl/g. The compatibilizer composition itself may include a higher proportion of bipolymer than used in many known or conventional compositions, and it has been found that a comparatively smaller concentration of compatibilizer is needed to achieve the observed enhancements in stiffness and impact.

In one aspect, the present disclosure relates to a compatibilizer composition containing (percent by weight):

A) from 30% to less than 70% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof; and B) from greater than 30% to 70% of a bipolymer component (Component B) of propylene and at least one comonomer selected from ethylene and/or $C_4$-$C_{10}$ α-olefins, the bipolymer containing from 50%-75% of propylene, wherein the bipolymer is soluble in xylene at room temperature and has an intrinsic viscosity [η] of from 4 to 7.5 dl/g (in decalin);

wherein the compatibilizer composition is characterized by a melt flow rate (MFR), a weight % ethylene moieties, and other parameters and features.

As an example and according to a further aspect, this disclosure also provides a compatibilizer composition that contains (percent by weight):

A) from 35% to 65% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof;

wherein Component A has a melt flow rate (MFR) of from 1 g/10 min to 500 g/10 min; and B) from 35% to 65% of a bipolymer component (Component B) of propylene and at least one comonomer selected from ethylene and/or $C_4$-$C_{10}$ α-olefins, wherein Component B is soluble in xylene at room temperature and has:

i) from 30 wt % to about 45 wt % ethylene or $C_4$-$C_{10}$ α-olefin moieties; and ii) an intrinsic viscosity at room temperature of from 4 dL/g to 7.5 dL/g (in decalin);

wherein the compatibilizer composition is characterized by a melt flow rate (MFR), a weight % ethylene moieties, and other properties.

In this aspect, the Component B can further be characterized by a melt flow rate (MFR) of less than about 0.15 g/10 min.

In another aspect, this disclosure relates a thermoplastic polyolefin compound comprising any compatibilizer composition as disclosed herein and at least one olefin polymer different from the compatibilizer composition. For example, the polyolefin compound can include: A) from 0.1 to 20% of a compatibilizer composition as disclosed herein, such as the compatibilizer compositions set out immediately above; and B) from 80% to 99.9% of at least one olefin polymer different from the compatibilizer composition, based on the combined amounts of these polymeric components, regardless of whether any optional components are used. Therefore, this compound may contain other, optional non-polymeric components or additives if desired. The at least one olefin polymer different from the compatibilizer composition can be selected from the group consisting of:

a) propylene homopolymers;

b) random copolymers and/or impact copolymers of propylene, including polypropylene random copolymers and/or polypropylene heterophasic copolymers, with at least one of ethylene and a $C_4$-$C_{10}$ α-olefin comonomer, wherein the total comonomer content ranges from 0.05 to 50% by weight with respect to the weight of the copolymer;

c) ethylene homopolymers and copolymers with at least one of $C_3$-$C_{10}$ α-olefins;

d) elastomeric copolymers of ethylene or propylene with at least one $C_2$-$C_{10}$ α-olefin, optionally containing minor quantities of a diene (for example, less than 6% by weight);

e) a thermoplastic elastomeric composition comprising at least one of propylene homopolymers and the copolymers of item b) and an elastomeric moiety comprising at least one of the copolymers of item d), containing the elastomeric moiety in quantities from 5 to 80% by weight; and f) blends of any two or more of the polymers or compositions of items a) to e).

Additional non-polymeric additives than can be used in this compound include, but are not limited to, fillers, processing aids, lubricants, stabilizers, pigments, antioxidants, plasticizers, antistatic agents, and any suitable combinations thereof. Other additives or other components that can be used in this compound include, but are not limited to, a recycled polyolefin material. When present, the combined optional components may be present from greater than or about 0 wt % (but present) up to about 20 wt % of the total composition.

This disclosure also provides for a method of improving the stiffness and impact strength of a thermoplastic polyolefin compound for injection molded applications comprising combining a compatibilizer composition and at least one olefin polymer different from the compatibilizer composition, to provide a thermoplastic polyolefin compound, the compatibilizer composition comprising or selected from any compatibilizer composition disclosed herein. Related compositions, articles and methods are encompassed by this disclosure; for example, there is provided a method of making an injection molded part comprising: A) providing a polymeric compound comprising any compatibilizer composition as disclosed herein and at least one olefin polymer different from the compatibilizer composition as disclosed herein; and B) injection molding a part with the compound. Injection molded parts or other articles made by this method are provided.

Regarding Component A and Component B of the compatibilizer composition and the polyolefin compound for injection molding that includes the compatibilizer composition, each of these independently can comprise, can consist essentially of, or can consist of the recited components. In a further aspect, Component A and Component B of the compatibilizer composition and the polyolefin compound that includes the compatibilizer composition, each of these independently can be absent any other unrecited polyolefin components, even when the overall compatibilizer or final injection molding compound can comprise additional components. According to another aspect, the Component A, Component B, or both Components A and B can comprise or can be selected from the recited polymer, copolymer or bipolymer.

These and various other aspects and embodiments of this disclosure are illustrated in the drawings, examples, data, and detailed description that follow.

DETAILED DESCRIPTION OF PREFERRED EMBODIMENTS

Figure 1:
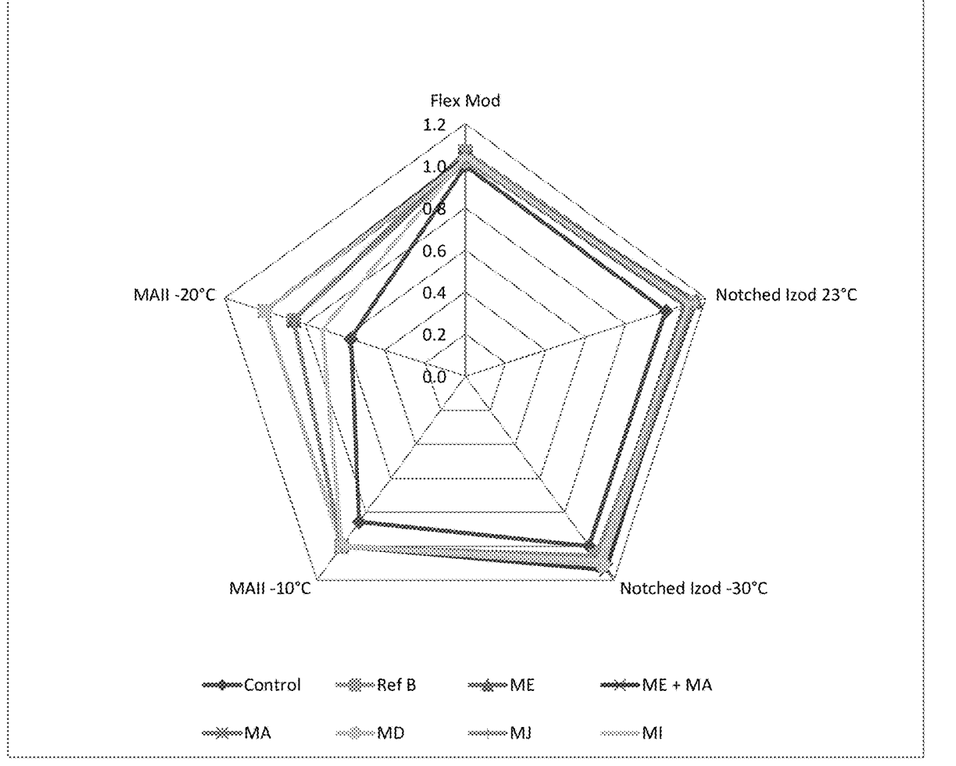
The FIGURE shows a spider web chart illustrating selected physical properties of injection molded polymer compounds prepared according to this disclosure. Data for compounds containing 28 wt % rubber content and presented in Table 5 are shown. Properties illustrated are: 1) ISO Flexural Modulus (2 mm/min, PMa); 2) ISO Notched Izod Impact (23° C., $kJ/m^2$); 3) ISO Notched Izod Impact (−30° C., $kJ/m^2$); 4) ASTM MAII (Multi-Axial Instrumental Impact at −10° C., 2.2 m/s, % ductile); and 5) ASTM MAII (Multi-Axial Instrumental Impact at −20° C., 2.2 m/s, % ductile). Plotted values are shown relative to the control compound, illustrated as the innermost (blue) plot.

The compatibilizer compositions provided herein impart unexpected enhancements in both stiffness and impact strength to the injection molded part when used according to this disclosure. Generally, conventional compatibilizer or masterbatch compositions can include a bipolymer component that is comparatively propylene poor. In contrast, the disclosed compatibilizer compositions includes a bipolymer component (Component B) that is relatively propylene rich and can contain, for example, from about 50 wt % to about 75 wt % propylene moieties. It has been discovered that the new compatibilizer composition imparts unexpected enhancements in both stiffness and impact strength when added to compounds of polypropylene homopolymer and/or impact copolymer and an ethylene-based or propylene-based plastomer and/or elastomer and used for injection molded parts.

The compatibilizer composition can contain at least two components referred to as Component A and Component B as defined herein, or alternatively, the compatibilizer composition can contain only these two components. Component A is a semi-crystalline polypropylene component selected from the group consisting of a propylene homopolymer, a random copolymer of propylene containing up to 8% of ethylene, and a random copolymer of propylene containing up to 8% of at least one $C_4$-$C_{10}$ α-olefin, which is characterized by a monomodal molecular weight distribution. Component A can be present in the compatibilizer composition from 30% to less than 70% by weight. All percentages are by weight, unless otherwise specified. Alternatively, Component A can be present in the compatibilizer composition from 35% to 65% by weight, from 40% to 60% by weight, from 40% to 55% by weight, or from 45% to 60% by weight. In one aspect, Component A can be present in the compatibilizer composition in weight percentages of about 30%, about 35%, about 40%, about 45%, about 50%, about 55%, about 60%, about 65%, or less than 70%, including any ranges between any of these individual values.

Component A, which forms the semi-crystalline polypropylene component having a monomodal molecular weight distribution, can be a propylene homopolymer, a random copolymer of propylene containing up to 8% by weight (for example, 0.2% to 6%) of ethylene, or a random copolymer of propylene containing up to 8% by weight (for example, 1% to 8%), of at least one $C_4$-$C_{10}$ α-olefin, having the formula $CH_2$=$CHR$, wherein R is a linear or branched alkyl $C_{2-8}$ radical or an aryl radical such as phenyl, tolyl and xylyl. Illustrative $C_4$-$C_{10}$ α-olefins include, for example, 1-butene, 1-pentene, 1-hexene, 4-methyl-1-pentene and 1-octene. The copolymers of propylene containing up to 8% of ethylene and/or at least one $C_4$-$C_{10}$ α-olefin, can contain the ethylene and/or the α-olefin in about 0.1% to 7% (total percentages by weight), about 0.2% to 6%, or about 0.3% to 5%. For example, the copolymers of propylene containing up to 8% of ethylene or at least one $C_4$-$C_{10}$ α-olefin, can contain the ethylene and/or the α-olefin in (total weight percentage) about 0.1%, about 0.2%, about 0.3%, about 0.4%, about 0.5%, about 0.6%, about 0.7%, about 0.8%, about 0.9%, about 1%, about 1.2%, about 1.4%, about 1.6%, about 1.8%, about 2%, about 2.2%, about 2.4%, about 2.6%, about 2.8%, about 3%, about 3.2%, about 3.4%, about 3.6%, about 3.8%, about 4%, about 4.5%, about 5%, about 5.5%, about 6%, about 6.5%, about 7%, about 7.5%, or about 8%, including any ranges between any of these individual values.

Component B is a bipolymer of propylene and at least one of ethylene and/or a $C_4$-$C_{10}$ α-olefin, and this bipolymer Component B can be present at a concentration of from greater than 30% to 70% in the compatibilizer composition. Alternatively, Component B can be present in the compatibilizer composition from 35% to 65% by weight, from 40% to 60% by weight, from 45% to 60% by weight, or from 40% to 55% by weight. In an aspect, Component B can be present in the compatibilizer composition in weight percentages of greater than 30%, about 35%, about 40%, about 45%, about 50%, about 55%, about 60%, about 65%, or about 70%, including any ranges between any of these individual values. While Component A (polypropylene component) has a monomodal molecular weight distribution, the molecular weight distribution of Component B is not limited and generally can be monomodal, bimodal or multimodal.

According to another aspect, the wt % of propylene moieties in the bipolymer component can be from about 50% to 75% (by weight) with the balance being at least one comonomer of ethylene, a $C_4$-$C_{10}$ α-olefin, or a combination thereof. Therefore, the term "bipolymer" applied to Component B is used regardless of whether Component B is a polymer of propylene and ethylene, propylene and at least one $C_4$-$C_{10}$ α-olefin, or propylene, ethylene, at least one $C_4$-$C_{10}$ α-olefin, thereby encompassing terpolymers and higher. Therefore, the total wt % of ethylene and/or at least one $C_4$-$C_{10}$ α-olefin moieties in the bipolymer component can be from about 25% to about 50% (by weight). Ethylene has been found to be useful as a comonomer. When present, the at least one $C_4$-$C_{10}$ α-olefin has the formula $CH_2$=$CHR$, where R is a linear or branched $C_{2-8}$ alkyl radical or an aryl radical such as phenyl, tolyl and xylyl. Illustrative $C_4$-$C_{10}$ α-olefins used in the bipolymer component (Component B) include, but are not limited to, 1-butene, 1-pentene, 1-hexene, 4-methyl-1-pentene, and 1-octene. Generally, minor amounts of a diene are not used in the bipolymer component. Alternatively, the wt % of ethylene and/or $C_4$-$C_{10}$ α-olefin moieties in the bipolymer Component B can be from about 28 wt % to about 48 wt %; alternatively, from about 30 wt % to about 45 wt %; alternatively, from about 33 wt % to about 45 wt %; alternatively, or from about 35 wt % to about 43 wt %. Alternatively still, the ethylene content of the bipolymer Component B can be from 30% to 48%, or alternatively, from 35% to 45%. In a further aspect, the wt % of ethylene moieties in the bipolymer component can be about 25 wt %, about 30 wt %, about 35 wt %, about 40 wt %, about 45 wt %, or about 50 wt %, including any ranges between any of these individual values.

Thus, compatibilizer compositions for use in accordance with this disclosure include a compatibilizer composition that can comprise (percent by weight):
  A) from 30% to less than 70% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof; and
  B) from greater than 30% to 70% of a bipolymer component (Component B) of propylene and at least one comonomer selected from ethylene and/or $C_4$-$C_{10}$ α-olefins, the bipolymer containing from 50%-75% of propylene, wherein the bipolymer is soluble in xylene at room temperature and has an intrinsic viscosity [η] of from 4 to 7.5 dl/g (in decalin).

Other suitable compatibilizer compositions according to this disclosure include a compatibilizer composition that can comprise (percent by weight):

A) from 35% to 65% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof;

wherein Component A has a melt flow rate (MFR) of from 1 g/10 min to 500 g/10 min; and B) from 35% to 65% of a bipolymer component (Component B) of propylene and at least one comonomer selected from ethylene and/or $C_4$-$C_{10}$ α-olefins, wherein Component B is soluble in xylene at room temperature and has:

i) from 33 wt % to about 45 wt % ethylene or $C_4$-$C_{10}$ α-olefin moieties; and ii) an intrinsic viscosity at room temperature of from 4 dL/g to 7.5 dL/g (in decalin).

Generally, the ethylene bipolymer Component B is soluble in xylene at room temperature. In one aspect, the intrinsic viscosity of the xylene-soluble bipolymer fraction (XSIV) of Component B at room temperature can be adjusted within certain ranges to achieve the disclosed results. For example, the room temperature XSIV of the bipolymer component can be from 4 dL/g to 7.5 dL/g; alternatively, from 4.5 dL/g to 6 dL/g; or alternatively from 4.7 to 5.8 dL/g. In a further aspect, the room temperature XSIV of the bipolymer component can be about 4 dL/g, about 4.1 dL/g, about 4.2 dL/g, about 4.3 dL/g, about 4.4 dL/g, about 4.5 dL/g, about 4.6 dL/g, about 4.7 dL/g, about 4.8 dL/g, about 4.9 dL/g, about 5 dL/g, about 5.1 dL/g, about 5.2 dL/g, about 5.3 dL/g, about 5.4 dL/g, about 5.5 dL/g, about 5.6 dL/g, about 5.7 dL/g, about 5.8 dL/g, about 5.9 dL/g, about 6 dL/g, about 6.1 dL/g, about 6.2 dL/g, about 6.3 dL/g, about 6.4 dL/g, about 6.5 dL/g, about 6.6 dL/g, about 6.7 dL/g, about 6.8 dL/g, about 6.9 dL/g, about 7 dL/g about 7.1 dL/g, about 7.2 dL/g, about 7.3 dL/g, about 7.4 dL/g, or about 7.5 dL/g. Moreover, any ranges between any of these individual XSIV values are also disclosed. While not intending to be bound by theory, it is thought that a high intrinsic viscosity bipolymer component also improves mechanical performance.

In addition, the intrinsic viscosity [η] of the xylene soluble fraction of the compatibilizer composition itself can be from 4 dL/g to 6 dL/g (in decalin). Alternatively, the intrinsic viscosity [η] of the xylene soluble fraction of the compatibilizer composition can be about 4 dL/g, about 4.1 dL/g, about 4.2 dL/g, about 4.3 dL/g, about 4.4 dL/g, about 4.5 dL/g, about 4.6 dL/g, about 4.7 dL/g, about 4.8 dL/g, about 4.9 dL/g, about 5 dL/g, about 5.1 dL/g, about 5.2 dL/g, about 5.3 dL/g, about 5.4 dL/g, about 5.5 dL/g, about 5.6 dL/g, about 5.7 dL/g, about 5.8 dL/g, about 5.9 dL/g, or about 6 dL/g (in decalin), including any ranges between any of these individual disclosed XSIV values.

In some embodiments, the melt flow rate (MFR) of the polypropylene component (Component A) can be from about 1 g/10 min to about 500 g/10 min. Alternatively, the (MFR) of the polypropylene ($C_3$) homopolymer component can be about, in units of g/10 min, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 g/10 min, including any ranges between any of these individual values.

In a further aspect, the melt flow rate (MFR) of the compatibilizer composition itself, as measured according to ASTM 1238, condition L, can range from about 0.1 g/10 min to about 10 g/10 min. In some aspects, the MFR of the compatibilizer composition can range from about 0.15 g/10 min to about 7 g/10 min; alternatively, from about 0.2 g/10 min to about 5 g/10 min; or alternatively from about 0.25 g/10 min to about 4 g/10 min. The MFR of the compatibilizer composition also can be 0.1 g/10 min, about 0.15 g/10 min, 0.2 g/10 min, about 0.25 g/10 min, 0.3 g/10 min, about 0.35 g/10 min, about 0.4 g/10 min, about 0.45 g/10 min, about 0.5 g/10 min, about 0.55 g/10 min, about 0.6 g/10 min, about 0.65 g/10 min, about 0.7 g/10 min, about 0.75 g/10 min, about 0.8 g/10 min, about 0.85 g/10 min, about 0.9 g/10 min, about 0.95 g/10 min, about 1 g/10 min, about 1.5 g/10 min, about 2 g/10 min, about 2.5 g/10 min, about 3 g/10 min, about 3.5 g/10 min, about 4 g/10 min, about 4.5 g/10 min, about 5 g/10 min, about 5.5 g/10 min, about 6 g/10 min, about 6.5 g/10 min, about 7 g/10 min, about 7.5 g/10 min, about 8 g/10 min, about 8.5 g/10 min, about 9 g/10 min, about 9.5 g/10 min, or about 10 g/10 min, including any ranges between these individual values.

An additional feature or aspect of this disclosure provides for certain wt % of ethylene moieties in the overall compatibilizer composition. For example, in some embodiments and aspects, the wt % ethylene moieties in the compatibilizer composition can be from about 7.5 wt % to about 38 wt %; alternatively, from about 10 wt % to about 35 wt %; from about 12 wt % to about 30 wt %; or from about 15 wt % to about 23 wt %. The wt % ethylene moieties in the compatibilizer composition also can be about 7.5 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, or about 38 wt %, including any ranges between any of these individual values.

A further aspect of the disclosure provides for a certain weight percentage of the xylene soluble fraction of the overall compatibilizer composition. For example, in some embodiments and aspects, the weight percentage of the xylene soluble fraction of the overall compatibilizer composition can be from about 25 wt % to about 67 wt %, about 30 wt % to about 65 wt %, about 35 wt % to about 60 wt %, about 40 wt % to about 58 wt %, about 42 wt % to about 57 wt %, about 45 wt % to about 55 wt %, or about 46% to about 54%. In further examples, the weight percentage of the xylene soluble fraction of the bipolymer component can be about 25 wt %, about 30 wt %, about 35 wt %, about 40 wt %, about 45 wt %, about 50 wt %, about 55 wt %, about 60 wt %, about 65 wt %, or about 67 wt %, or any ranges between any of these individual values.

Yet another aspect of this disclosure provides for a method of improving the stiffness and impact strength of a thermoplastic polyolefin compound for injection molded applications comprising combining a compatibilizer composition and at least one olefin polymer different from the compatibilizer composition, and various optional component(s) if desired, to provide a thermoplastic polyolefin compound that can be injection molded. For example, the method of improving the stiffness and impact strength of a thermoplastic polyolefin compound for injection molded applications can comprise: a) obtaining or providing a polymeric compound comprising the combination of the at least one olefin polymer of component 1) above; the compatibilizer composition of component 2) above; and any of the optional ingredients of component 3) above; and b) injection molding a part with the polymeric compound.

An example of a polymeric compound for injection molded applications includes a polymeric compound that can comprise: a) from 30 wt % to 70 wt % of one or more of a polypropylene ($C_3$) homopolymer and/or impact copolymer; b) from 10 wt % to 30 wt % of one or more elastomeric copolymers of ethylene or propylene with at least one component selected from propylene and a $C_2$-$C_{10}$ α-olefin; c) from 5 wt % to 30 wt % of a filler; and d) from 3 wt % to 20 wt % of the compatibilizer composition as disclosed herein.

In certain embodiments, a diene is not employed in preparing the compatibilizer composition of this disclosure. That is, Component A, Component B, or both Component A and Component B may lack any diene. A diene can be used as an optional component in the olefin polymer different from the compatibilizer composition that is useful in preparing the blended polymer composition used for injection molding. In this case, the diene can be used at a concentration of from about 0.1% to about 6%, alternatively less than or about 6%, less than or about 5%, less than or about 4%, less than or about 3%, less than or about 2%, less than or about 1%, or less than or about 0.5%.

In one aspect, the disclosed compatibilizer composition can be prepared by at least a two-step sequential polymerization, in which components A and B are prepared in separate subsequent steps, operating in each step, except the first step, in the presence of the polymer formed and the catalyst used in the preceding step. The catalyst is generally added only in the first step; however, its activity is such that it is still active for all the subsequent steps. Thus, in at least the first polymerization step the relevant monomer(s) are polymerized to form Component A, and in the other step(s) a mixture of propylene and ethylene or $C_4$-$C_{10}$ α-olefin(s) is polymerized to form Component B. The sequential polymerization is performed using a stereospecific Ziegler-Natta catalyst capable of producing polypropylene having an isotacticity index greater than 90%, or alternatively, greater than 95%. According to an aspect, the catalyst is sufficiently sensitive to molecular weight regulators (particularly hydrogen) that it can produce polypropylene having MFR values from less than 1 g/10 min to 1000 g/10 min or more.

Useful Ziegler-Natta catalysts which possess these properties generally contain: (i) a solid catalyst component comprising a titanium compound having at least one titanium-halogen bond, and an electron-donor compound, both supported on a magnesium halide in active form; (ii) a co-catalyst component comprising an organoaluminum compound, such as an aluminum alkyl compound; and optionally, (iii) an external electron donor compound. Examples of such catalysts are well known to those of ordinary skill in the art, with such catalysts being disclosed, for example, in U.S. Pat. Nos. 4,399,054 and 4,472,524, the disclosures of which are hereby incorporated by reference in their entireties.

The solid catalyst component of the Ziegler-Natta catalyst acts an internal electron donor, and may be a compound selected from the group consisting of ethers, ketones, lactones, compounds containing N, P and/or S atoms, and esters of mono- and dicarboxylic acids. Electron-donor compounds may further include, but are not limited to, phthalic acid esters, such as diisobutyl, dioctyl, diphenyl and benzylbutyl phthalate. Additional electron-donors for use in the present disclosure are 1,3-diethers of the following formula:

where $R^I$ and $R^{II}$ are the same or different and are $C_{1-18}$ alkyl, $C_{3-18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three sites of unsaturation. Ethers of this type are described in, for example, published European Patent Application Nos. 0361493 and 0728769, each of which is incorporated herein in pertinent part. Representative examples of these diethers include 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl) fluorene.

The solid catalyst component may be prepared according to various methods. For example, a $MgCl_2 \cdot nROH$ adduct (e.g. in the form of spheroidal particles) wherein n is generally from 1 to 3 and ROH is ethanol, butanol or isobutanol, may be reacted with an excess of $TiCl_4$ containing the electron donor compound. The reaction temperature is generally from 80° C. to 120° C. The solid is then isolated and reacted once more with $TiCl_4$, in the presence or absence of the electron donor compound, after which it is separated and washed with aliquots of a hydrocarbon until all chlorine ions have been removed.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds which can be used for the preparation of the solid catalyst component are, for example, titanium halides and titanium halogen alcoholates, such as titanium tetrachloride.

The reactions described above result in the formation of a magnesium halide in active form. Other reactions are known in the literature, which cause the formation of magnesium halide in active form starting from magnesium compounds other than halides, such as magnesium carboxylates. The active form of magnesium halide in the solid catalyst component can be recognized by the fact that in the X-ray spectrum of the catalyst component, the maximum intensity reflection appearing in the spectrum of the non-activated magnesium halide (having a surface area smaller than 3 $m^2$/g) is no longer present, but in its place there is a halo with the maximum intensity shifted with respect to the position of the maximum intensity reflection of the non-activated magnesium dihalide, or by the fact that the maximum intensity reflection shows a width at half-peak at least 30% greater than the one of the maximum intensity reflection which appears in the spectrum of the non-activated magnesium halide. The most active forms are those where the above-mentioned halo appears in the X-ray spectrum of the solid catalyst component. Among magnesium halides, the magnesium chloride is generally very useful. In the case of the most active forms of magnesium chloride, the X-ray spectrum of the solid catalyst component shows a halo instead of a reflection which in the spectrum of the nonactivated chloride appears at 2.56 Å.

The Al-alkyl compounds used as co-catalysts as disclosed herein can comprise or can be selected from the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio can be from 1 to 1000.

The electron donor compounds that can be used as external donors include aromatic acid esters such as alkyl benzoates, including silicon compounds containing at least one Si—OR bond, where R is a hydrocarbon radical. Examples of silicon compounds include, but are not limited to, (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Further, 1,3-diethers having the formulae described above can also be used advantageously. If the internal donor is one of these diethers, the external donors can be omitted if desired.

The molecular weight of the polymers may be regulated using known molecular weight regulators such as, for example, hydrogen. By properly dosing the concentration of the molecular weight regulator in the relevant polymerization step(s), the previously described MFR and [η] values may be obtained. For example, for preparing Component A the hydrogen feed ratio $H_2/C_3$ (mol) ratio may range from about 0.0001 to about 1.5, while the $H_2/C_2$ (mol) ratio for preparing bipolymer Component B may range from about 0.0001 to about 0.02.

The whole polymerization process, which can be continuous or batch, can be performed according to known techniques and operating in liquid phase, optionally in the presence of an inert diluent, or in the gas phase, or by mixed liquid-gas techniques. Carrying out the polymerization in the gas phase may be particularly useful, and generally there is no need for intermediate steps except for the possible degassing of unreacted monomers. Reaction time, pressure and temperature relative to the two steps are not critical, however it may be advantageous if the temperature is from about 20° C. to about 100° C. The pressure can be atmospheric or higher.

If desired, the catalyst can be pre-contacted with a small amount of olefin in a prepolymerization step using techniques and apparatuses that are well known to one of ordinary skill in the art.

The amount of compatibilizer composition present in the polyolefin compound generally ranges from about 0.1% to about 20% by weight; alternatively, from about 0.5% to about 18% by weight; alternatively, from about 1% to about 17% by weight; alternatively, from about 2% to about 16% by weight; or alternatively, from about 3% to about 15% by weight, based on the total weight of the polyolefin compound. In an aspect, the compatibilizer composition is present in an amount sufficient to so that at least about 3% by weight of Component B is present, based on total weight of the compound.

The compatibilizer composition and/or the polyolefin compound can also contain additives commonly employed in the art, such as for example, antioxidants, light stabilizers, heat stabilizers, nucleating agents, colorants, fillers and related additives. The polyolefin compound may be manufactured by mixing the compatibilizer composition and additives with other olefin polymers different from the compatibilizer composition as described above, extruding the mixture, and pelletizing the resulting compound using known techniques and apparatuses. In alternative aspects or embodiments, the polyolefin compound may be prepared without using a compatibilizer. Instead, the components of the compatibilizer may be individually prepared and mixed or combined with the other components of the polyolefin compound, either simultaneously or in any desired sequence.

The polyolefin compounds described in this disclosure can be used to prepare finished or semi-finished articles having a desirable balance of properties, including but not limited to flexural modulus, impact resistance and gloss. In some embodiments, the polyolefin compound has utility in the production of injection molded articles because the resulting stiffness/impact balance and the lack of gels.

Additional aspects of the disclosed polyolefin compounds are presented in the following Examples. These Examples are illustrative only, and are not intended to limit the scope of the disclosure.

EXAMPLES

General Experimental Procedures.

The following general procedure, experimental details, and analytical methods, were used in developing the disclosure and characterizing the compositions prepared herein.

MFR (Melt Flow Rate).

MFR was measured according to ISO 1133, International Standard, Plastics—Determination of the melt mass-flow rate (MFR) and the melt volume-flow rate (MVR) of thermoplastics, ISO, Geneva, Switzerland.

$C_2$ Content.

The reported % $C_2$ (ethylene) in the bipolymer and bipolymer split values are calculated using mass balance calculations, which use measured MFR, XS, and total % $C_2$ as inputs. The % $C_2$ can be directly measured in the final resin, and xylene-soluble (XS) portion, and the xylene-insoluble (XI) portion, for example, according to ITM 20061—Infrared Spectrophotometric Determination of Ethylene Content in Propylene-Ethylene Semi crystalline Copolymers.

XS Fraction.

ISO 16152 International Standard, Plastics—Determination of xylene-soluble matter in polypropylene. Xylene Soluble Fraction and Xylene Insoluble Fraction are determined because the percent by weight of polymer insoluble in xylene at room temperature is considered a measure of the isotacticity index of the polymer as determined by extraction with boiling n-heptane, which constitutes the isotacticity index of polypropylene.

XSIV.

ISO 1628-1 International Standard, Plastics—Determination of the viscosity of polymers in dilute solution using capillary viscometers.

Gel Test.

For the assessment in Table 1, gel test results were obtained from a qualitative visual inspection test where a compound containing a small amount (5-12%) of the compatibilizer compositions was injection molded into a spiral flow plaque and the number of defect spots were counted and compared to a known acceptable sample. In this case, sample 3F is the known sample. Assessment nomenclature such as Good means better than 3F, whereas Poor means worse than 3F. In Table 5, a different gel test was used where the compatibilizer candidates were blended at 5 wt % with a commercial film grade (Adlex™ Q100F) and cast into a thin film. Here the defect spots of different sizes were counted quantitatively by an optical scanning camera.

Impact Test.

This assessment was based on a qualitative combination of ISO 180 Izod Impact test results and ASTM D3763 Multi-axial Instrumental Impact (MAII) ductility test results. The Izod measurements were carried out at 23° C. and −30° C. and with different amounts of total rubber in the final compound (20-30%), so the results are relative to other samples at the same conditions. As an example, at 24% total rubber and 23° C. the results range from 11 to 18 kJ/m$^2$, while at −30° C. the results were from 2.5 to 3.3 kJ/m$^2$ (where higher values show better impact performance). The ductility tests measure whether the sample fails in a ductile manner (good) or brittle manner (bad) when a plaque is punctured. The percentage of ductile failures was used to assess the material and depends on amount of rubber (20-30%) and the temperature (−40° C. to 23° C.). At 23° C., anything less than about 100% is usually considered poor impact performance. At −30° C., typically anything above about 0% is considered good impact performance.

Stiffness Test.

Flexural modulus was measured by the ISO 178 flexural modulus test performed on the compounds. This test was again a relative assessment using multiple results at different levels of rubber to get an overall performance rating. At 24% rubber, the flexural modulus range was from about 1750 MPa to about 1950 MPa, whereas at 30% rubber, the flexural modulus range was from about 1650 MPa to 1800 MPa (where higher values show better stiffness performance).

Example 1. Samples of Potential Compatibilizer Compositions

A compatibilizer production run was carried out as disclosed herein to produce eight composition samples, each containing approximately 1000 kg of pellets, termed "macro" samples. These samples were produced by collecting the products during the controlled, steady state reactor conditions such that the pellets produced during the entire time were consistent in composition and structure.

In addition to the eight large samples, one shorter controlled run was carried out and pellets were collected at a different ethylene ($C_2$) concentration in the bipolymer, shown as Example G. The Example G sample contained approximately 220 kg of pellets. Approximately 23 kg or "micro" samples from each of the eight 1000 kg macro samples were taken from the homogenized boxes and tested for a pre-screening evaluation of compatibilizer performance.

The structural properties of the 23 kg samples used for the pre-screening tests are presented in Table 1. All micro samples except micro sample B correspond to the 1000 kg macro sample composition in the Table 2 below. Example B contains 90% pellets from the Sample A material that was dry blended with 10% of an approximately 30 MFR homopolymer to increase the final MFR and decrease bipolymer split of the final blended resin. Therefore, there is no macro sample that corresponds to micro sample B.

TABLE 1

Summary of compatibilizer composition properties and structure of micro samples

| Micro Sample n. | Corresponding Macro Sample Number n. | Quantity kg | MFR g/10' | $C_2$ % | Xylene Soluble % | % B component % | XSIV dl/g |
|---|---|---|---|---|---|---|---|
| A | MA | 23 | 0.54 | 21.0 | 46.2 | 49.7 | 5.9 |
| B | — | 23 | 0.89 | 18.8 | 41.1 | 43.8 | 6.0 |
| C | MC | 23 | 0.50 | 21.0 | 45.3 | 48.7 | 5.5 |
| D | MD | 23 | 0.81 | 19.0 | 45.9 | 49 | 5.3 |
| E | ME | 23 | 0.38 | 23.0 | 51.2 | 55.4 | 5.2 |
| F | MF | 23 | 0.51 | 23.2 | 53.0 | 57.3 | 4.9 |
| G | MG | 23 | 0.45 | 27.0 | 53.9 | 59.3 | 5.0 |
| H | MH | 23 | 0.57 | 23.0 | 53.8 | 58.2 | 4.6 |
| I | MI | 23 | 0.73 | 20.0 | 46.2 | 49.5 | 5.4 |
| J | MJ | 23 | 0.61 | 22.2 | 50.5 | 54.5 | 5.6 |

The reported % B component (bipolymer split) values were calculated using mass balance calculations, which use measured MFR, XS, and total % $C_2$ as inputs. The remaining values in the table come from analytical testing. The XSIV measurements were carried out in decalin.

The structural properties of the macro samples are summarized in Table 2, where four macro samples were tested for composition and structure. These four were chosen as promising candidates after the initial screening of the small samples.

TABLE 2

Summary of properties and structure of four macro samples

| Macro Sample n. | Quantity Kg | MFR (230° C., 2.16 kg) g/10' | $C_2$ % | Xylene Soluble % | % B component % | XSIV dl/g |
|---|---|---|---|---|---|---|
| MA | ≈1000 | 0.40 | 22.8 | 52.6 | 56.9 | 5.9 |
| MC | ≈1000 | 0.46 | 21.2 | 51.3 | 55.3 | 5.5 |
| MD | ≈1000 | 0.79 | 19.5 | 43.3 | 46.4 | 5.4 |
| MJ | ≈1000 | 0.58 | 22.8 | 53.4 | 57.7 | 5.7 |

Example 2. Gel Film Testing of the Compatibilizer Formulation

Each of the macro and micro samples described in the example above (5 wt %) were blended with LyondellBasell Adlex™ Q100F thermoplastic polyolefin (95%) and extruded into a film to obtain a preliminary gel analysis of each of these materials. The results from the micro sample films are shown in Table 3a, while the macro sample films are shown in Table 3b. In addition, films made with 5% conventional compatibilizers (designated Ref A, Ref B, and Ref C compatibilizers) are shown in Table 3c for comparison.

The data in these tables are used as relative comparison among the gel performance of the compatibilizer formulations and do not strictly represent quantitative gel performance in commercial applications. However, this film analysis method has been used as a proxy for commercial gel performance based on its good correlation with gel performance in other applications such as injection molded parts.

TABLE 3a

Results of gel analysis of films made with 95% Adflex™ Q100F and 5% Micro samples

| Micro Sample Used for Film n. | Gels diam. ≥ 2.5 mm | Gels diam. 1.5-2.5 mm | Gels diam. 0.7-1.5 mm | Gels diam. 0.5-0.7 mm |
|---|---|---|---|---|
| A | — | — | — | — |
| A | 0 | 0 | 0 | 3 |
| B | 0 | 0 | 1 | 11 |
| C | 0 | 0 | 1 | 19 |
| D | 0 | 0 | 1 | 2 |
| E | 0 | 0 | 0 | 1 |
| F | 0 | 0 | 0 | 0 |
| G | 0 | 0 | 0 | 1 |
| H | 0 | 0 | 0 | 0 |
| I | 0 | 0 | 1 | 2 |
| J | 0 | 0 | 0 | 4 |

TABLE 3b

Results of gel analysis of films made with 95% Adflex™ Q100F and 5% Macro samples

| Macro Sample Used for Film n. | Gels diam. ≥ 2.5 mm | Gels diam. 1.5-2.5 mm | Gels diam. 0.7-1.5 mm | Gels diam. 0.5-0.7 mm |
|---|---|---|---|---|
| MA | — | — | — | — |
| MA | 0 | 0 | 0 | 3 |
| MC | 0 | 0 | 0 | 1 |
| MD | 0 | 0 | 0 | 3 |
| ME | 0 | 0 | 0 | 0 |
| MF | 0 | 0 | 0 | 0 |
| MG | 0 | 0 | 0 | 1 |
| MH | — | — | — | — |
| MI | 0 | 0 | 0 | 3 |
| MJ | 0 | 0 | 0 | 2 |

TABLE 3c

Results of gel analysis of films made with 95% Adflex™ Q100F and 5% Reference samples

| Reference Sample Used for Film [A] n. | Gels diam. ≥ 2.5 mm | Gels diam. 1.5-2.5 mm | Gels diam. 0.7-1.5 mm [B] | Gels diam. 0.5-0.7 mm [B] |
|---|---|---|---|---|
| Ref A | — | — | — | — |
| Ref A | 0 | 0 | 40/18 | 130/94 |
| Ref A | 0 | 0 | 1 | 25 |
| Ref B | 0 | 0 | 1/0 | 1/1 |
| Ref B | 0 | 0 | 1 | 6 |
| Ref C | 0 | 0 | 1/1 | 12/6 |
| Ref C | 0 | 0 | 1/1 | 10/7 |

[A] Ref A sample is characterized by XSIV 8.0 dL/g; Final MFR 1.0 g/10 min; and 30% B component in the compatibilizer (bipolymer split); Ref B sample is characterized by XSIV 7.5 dL/g; Final MFR 1.3 g/10 min; and 30% B component in the compatibilizer; Ref C sample is characterized by XSIV 6 dL/g; Final MFR 0.9 g/10 min; and 55% B component in the compatibilizer.
[B] Two reported numbers in the same test row (e.g. 40/18) correspond to tests on two different samples of the compound.

As noted in Table 3c, the Reference A (Ref A) compatibilizer contains rubber with an XSIV of about 8, while the Ref B compatibilizer has a slightly lower XSIV rubber after re-extrusion. The Ref B conventional compatibilizer is considered to provide only borderline performance for use in painted applications where gels are important, and represents an approximate upper boundary for gel performance for the products made according to this disclosure. As seen in Tables 3a, 3b and 3c, all of the films made with the macro and micro samples described in this example have lower gel counts than the films made with the Ref A compatibilizer and gel counts that are somewhat comparable to the Ref B compatibilizer performance. Multiple reported numbers in Table 4c correspond to tests on two different samples of the material.

The Ref C compatibilizer sample contains rubber with an XSIV of 6, which is similar to the XSIV of the samples produced according to the inventive examples. While this XSIV may have suggested initially that the gel performance of the Ref C compatibilizer would be similar to the inventive samples, in fact, the Ref C films had more gels than the macro samples.

Example 3. Compounding of the Compatibilizer Compositions with a Propylene Homopolymer and $C_2$-$C_4$ Plastomer The compatibilizer polymer particles of Example 1 along with the propylene homopolymer, plastomer, and additional components were introduced through feed lines of an extruder to prepare the compounds. The amounts and properties of the compound components and of the resulting compounds are described in Table 5. The following propylene homopolymers were used: LyondellBasell Adstif™ HA801U (Homopolymer A), a high melt flow (65 g/10 min) propylene homopolymer; and Metocene™ MF650Y (Homopolymer B), an ultrahigh melt flow (1800 g/10 min) propylene homopolymer. The plastomer was Engage™ 7467, an ethylene-butene ($C_2$-$C_4$) copolymer used in 25-28 wt % in the compounds prepared and tested. Additional components used in the compounds that were tested included talc filler, black masterbatch, B-225 antioxidant (Irganox®), and calcium stearate.

Example 4. Properties of Compounds Using the Disclosed Compatibilizers

Table 5 provides the amounts and properties of the compound components and of the resulting compounds prepared using the compatibilizer polymer particles of Example 1, and the test results of the compounds.

The control sample compound does not include a compatibilizer. The conventional sample compound was prepared using compatibilizer Ref B. The other compatibilizer samples are listed in Table 5.

The Table 5 data show the unexpectedly good results obtained using the disclosed compatibilizer compositions. Particularly noteworthy are the high ductile failure rates versus brittle failures for the compounds of Table 5, which show outstanding performance.

TABLE 5

Compositions and properties of polypropylene homopolymer and $C_2$-$C_4$ Plastomer compounds with selected compatibilizer compositions

| Raw Material | MFR | Component B, wt % | Control | Ref B | ME | ME + MA | MA | MD | MJ | MI |
|---|---|---|---|---|---|---|---|---|---|---|
| Polypropylene Homopolymer Matrix A | 65 | 0 | 49.7 | 33.0 | 42.1 | 41.9 | 41.5 | 41.2 | 42.5 | 42.0 |
| Polypropylene Homopolymer Matrix B | 1800 | 0 | 3.0 | 12.7 | 8.2 | 8.4 | 8.7 | 8.4 | 7.9 | 8.0 |
| Plastomer ($C_2$-$C_4$) Component | 3 | 100 | 28.0 | 25.0 | 25.0 | 25.0 | 25.0 | 25.0 | 25.0 | 25.0 |
| Ref B | 1.3 | 30 | | 10.0 | | | | | | |
| ME | (0.38)[A] | (55.4)[A] | | | 5.4 | 2.7 | | | | |
| MA | 0.40 | 56.9 | | | | 2.7 | 5.5 | | | |
| MD | 0.79 | 46.4 | | | | | | 6.1 | | |
| MJ | 0.58 | 57.7 | | | | | | | 5.3 | |
| MI | (0.73)[A] | (49.5)[A] | | | | | | | | 5.7 |
| talc | | | 18.0 | 18.0 | 18.0 | 18.0 | 18.0 | 18.0 | 18.0 | 18.0 |
| Black Masterbatch | | | 1.0 | 1.0 | 1.0 | 1.0 | 1.0 | 1.0 | 1.0 | 1.0 |
| Antioxidant B 225 | | | 0.2 | 0.2 | 0.2 | 0.2 | 0.2 | 0.2 | 0.2 | 0.2 |
| Calcium stearate | | | 0.1 | 0.1 | 0.1 | 0.1 | 0.1 | 0.1 | 0.1 | 0.1 |
| Total | | | 100.0 | 100.0 | 100.0 | 100.0 | 100.0 | 100.0 | 100.0 | 100.0 |

| Parameter | Standard | Units | Control | Ref B | ME | ME + MA | MA | MD | MJ | MI |
|---|---|---|---|---|---|---|---|---|---|---|
| Melt Flow Rate | ASTM | g/10 min | 28.1 | 27.5 | 28.0 | 28.6 | 28.9 | 27.8 | 28.1 | 28.8 |
| Density | ISO | g/cc | 1.02 | 1.02 | 1.02 | 1.02 | 1.02 | 1.02 | 1.02 | 1.02 |
| ISO Tensile Strength, Yield | ISO | MPa | 19.1 | 19.3 | 18.8 | 19.1 | 19.2 | 18.9 | 18.9 | 19.0 |
| ISO Elongation-at-Break | ISO | % | 104 | 99 | 112 | 126 | 126 | 136 | 119 | 124 |
| ISO Flexural Modulus | ISO | MPa | 1,746 | 1,865 | 1,799 | 1,817 | 1,797 | 1,789 | 1,781 | 1,816 |
| ISO Notched Izod Impact at 23° C. | ISO | kJ/m$^2$ | 36.3 | 41.1 | 41.8 | 40.4 | 39.7 | 40.9 | 41.3 | 40.5 |
| ISO Notched Izod Impact at −30° C. | ISO | kJ/m$^2$ | 3.6 | 3.8 | 4.0 | 4.1 | 3.9 | 4.0 | 3.9 | 3.9 |
| MAII @ −10° C., 2.2 m/s, % Ductile | ASTM | 7 plaques | 86% | 100% | 100% | 100% | 100% | 100% | 100% | 100% |
| MAII @ −20° C., 2.2 m/s, % Ductile | ASTM | 7 plaques | 57% | 86% | 86% | 100% | 100% | 100% | 86% | 71% |
| MAII @ −30° C., 2.2 m/s, % Ductile | ASTM | 2 plaques | 0/2 ductile | 0/2 ductile | 2/2 ductile | 2/2 ductile | 2/2 ductile | 2/2 ductile | 2/2 ductile | 2/2 ductile |

[A] The listed MFR and wt % Component B values for samples ME and MI were measured on the micro samples E and I, although the compound was prepared using the macro samples ME and MI.

As disclosed herein, structural properties that provide good performance in the compatibilizers include a propylene rich bipolymer component (Component B) and an XSIV that falls within a certain range. For example, when the bipolymer Component B contains from about 50%-75% propylene and wherein the bipolymer is soluble in xylene at room temperature and has an intrinsic viscosity [η] of from 4 to 7.5 dl/g (in decalin), unexpectedly good results are observed. In some compatibilizers, Component B can contain from about 0% to about 50% ethylene, for example, when the bipolymer is a propylene-butylene bipolymer. Therefore, while typically the 25%-50% balance of the bipolymer (non-propylene) is ethylene, it is also possible to use a bipolymer in which this 25%-50% balance is at least one $C_4$-$C_{10}$ α-olefin or any combination of ethylene and at least one $C_4$-$C_{10}$ α-olefin. Excellent compatibilizer performance is particularly observed in Component B having from about 25% to about 50% ethylene and XSIV of from about 4 dL/g to about 7.5 dL/g, for example from about 4.5 dL/g to about 6.0 dL/g.

In some embodiments, the compatibilizer itself comprises a higher proportion of bipolymer than used in known or conventional compositions, and it has been found that a comparatively smaller concentration of compatibilizer is needed to achieve the observed enhancement in stiffness and impact. Additional structural variables such as bipolymer split (% Component B), MFR, and the like, and their ranges for imparting good performance were determined by manufacturing and processing constraints and limitations.

The disclosures of various publications that may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

For any particular compound disclosed herein, the general structure presented is also intended to encompass all conformational isomers and stereoisomers that can arise from a particular set of substituents, unless indicated otherwise. Thus, the general structure encompasses all enantiomers, diastereomers, and other optical isomers whether in enantiomeric or racemic forms, as well as mixtures of stereoisomers, as the context permits or requires. For any particular formula that is presented, any general formula presented also encompasses all conformational isomers, regioisomers, and stereoisomers that can arise from a particular set of substituents. Accordingly, Applicant reserves the right to proviso out any particular individual isomer or isomers, if for any reason Applicant chooses to claim less than the full measure of the disclosure, for example, to account for a reference that Applicant is unaware of at the time of the filing of the application.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components. Therefore, by the disclosure that a composition, a method, and the like "comprises" one or more elements or steps, Applicant also intends to disclose that the composition, the method, and the like may also "consist essentially of" or "consist of" the recited elements or steps.

Regarding the compatibilizer composition, Component A, Component B, or both Components A and B can comprise, can be selected from, can consist essentially of, or can consist of the recited polymer or copolymer. Further, Component A, Component B, or both Components A and B can be absent any other unrecited olefin polymer or copolymer component, and this disclosure provides for this negative limitation by disclosing that, in some aspect and embodiments, Component A, Component B, or both can be absent any other unrecited polymer component. According to another aspect, the Component A, Component B, or both Components A and B can comprise or can be selected from the recited polymer or copolymer, while also being absent any other unrecited olefin polymer or copolymer component.

As used in the specification and the claims, the singular forms "a," "an," and "the" include plural referents unless the context clearly indicates otherwise. Thus, for example, reference to "a compound" includes mixtures of two or more such compounds, while reference to "the composition" includes mixtures of two or more such compositions, and the like.

"Optional" or "optionally" means that the subsequently described event or circumstance can or cannot occur, and that the description includes instances where the event or circumstance occurs and instances where it does not.

Unless indicated otherwise, when a range of any type is disclosed or claimed, for example a range of the percentages, concentrations, weights, melt flow rates (MFR) and the like, it is intended to disclose or claim individually each possible number that such a range could reasonably encompass, including any sub-ranges or combinations of sub-ranges encompassed therein. When describing a range of measurements such as these, each possible number that such a range could reasonably encompass can, for example, refer to values within the range with one significant FIGURE more than is present in the end points of a range, or refer to values within the range with the same number of significant FIGURES as the end point with the most significant FIGURES, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicant's intent is that these two methods of describing the range are interchangeable. Accordingly, Applicant reserves the right to proviso out or exclude any individual members of any such group, including any sub-ranges or combinations of sub-ranges within the group, if for any reason Applicant chooses to claim less than the full measure of the disclosure, for example, to account for a reference that Applicant is unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, within 2% of the recited value, or within 1% of the recited value.

Any headings that are employed herein are not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Applicants reserve the right to proviso out any selection, feature, range, element, or aspect, for example, to limit the scope of any claim to account for a prior disclosure of which Applicants may be unaware.

These and other features, advantages and embodiments of the invention disclosed herein will be readily apparent to those exercising ordinary skill after reading the foregoing disclosures. Accordingly, while specific embodiments of the invention have been described in considerable detail, variations and modifications of those embodiments can be effected without departing from the spirit and scope of the invention as claimed.

We claim:

1. A compatibilizer composition comprising (percent by weight):
   A) from 30% to less than 70% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof; and
   B) from greater than 30% to 70% of a bipolymer component (Component B) of propylene and at least one comonomer selected from ethylene and/or $C_4$-$C_{10}$ α-olefins, the bipolymer comprising 50-75% of propylene, wherein the bipolymer is soluble in xylene at room temperature and has an intrinsic viscosity [η] of 4-7.5 dl/g, in decalin.

2. The compatibilizer composition of claim 1, wherein:
A) Component A is present from 35-65% of the compatibilizer composition and is characterized by a melt flow rate (MFR) of 1-500 g/10 min; and
B) Component B is present from 35-65% in the compatibilizer composition and wherein Component B is soluble in xylene at room temperature and comprises:
  i) about 30 wt % to about 45 wt % ethylene moieties; and
  ii) an intrinsic viscosity [η] at room temperature of 4-7 dL/g, in decalin.

3. The compatibilizer composition of claim 1, wherein the bipolymer component (Component B) comprises 25-50 wt % ethylene moieties.

4. The compatibilizer composition of claim 1, wherein Component B is characterized by a melt flow rate (MFR) of less than about 0.15 g/10 min.

5. The compatibilizer composition of claim 1, wherein the compatibilizer composition comprises 40-60 wt % of Component A and 40-60 wt % of Component B.

6. The compatibilizer composition of claim 1, wherein the melt flow rate (MFR) of the compatibilizer composition is 0.35-1 g/10 min.

7. The compatibilizer composition of claim 1, wherein the compatibilizer composition is characterized by a xylene soluble fraction of 25-67 wt %.

8. The compatibilizer composition of claim 1, wherein the intrinsic viscosity [η] of the xylene soluble fraction of the compatibilizer composition is 4-6 dL/g, in decalin.

9. The compatibilizer composition of claim 1, wherein the molecular weight distribution of Component B is monomodal.

10. The compatibilizer composition of claim 1, wherein the molecular weight distribution of Component B is bimodal.

11. The compatibilizer composition of claim 1, wherein the Component A, Component B, or both Component A and Component B do not comprise a diene.

12. The compatibilizer composition of claim 1, wherein Component A, Component B, or both Component A and Component B do not comprise any other unrecited olefin polymer or copolymer component.

13. A thermoplastic polyolefin composition comprising a compatibilizer composition and at least one olefin polymer different from the compatibilizer composition, the compatibilizer composition comprising (percent by weight):
A) from 30% to less than 70% of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof; and
B) from greater than 30% to 70% of a bipolymer component (Component B) of propylene and at least one comonomer selected from ethylene and/or $C_4$-$C_{10}$ α-olefins, the bipolymer containing from 50-75% of propylene, wherein the bipolymer is soluble in xylene at room temperature and has an intrinsic viscosity [η] of from 4-7.5 dl/g, in decalin.

14. The thermoplastic polyolefin compound of claim 13, wherein:
A) Component A is present from 35-65% of the compatibilizer composition and is characterized by a melt flow rate (MFR) of 1-500 g/10 min; and
B) Component B is present from 35-65% of the compatibilizer composition and is soluble in xylene at room temperature and comprises:
  i) about 30 wt % to about 45 wt % ethylene moieties; and
  ii) an intrinsic viscosity at room temperature of 4-7 dL/g, in decalin.

15. A thermoplastic polyolefin compound according to claim 13, wherein the bipolymer component (Component B) comprises from 25 wt % to 50 wt % ethylene moieties.

16. The thermoplastic polyolefin compound of claim 13, wherein the at least one olefin polymer different from the compatibilizer composition is/are selected from:
  a) propylene homopolymers;
  b) random copolymers and/or impact copolymers of propylene;
  c) ethylene homopolymers and copolymers with at least one of $C_3$-$C_{10}$ α-olefins;
  d) elastomeric copolymers of ethylene or propylene with at least one $C_2$-$C_{10}$ α-olefin, optionally containing minor quantities of a diene;
  e) a thermoplastic elastomeric composition comprising at least one of propylene homopolymers and the copolymers of item b) and an elastomeric moiety comprising at least one of the copolymers of item d), containing the elastomeric moiety in quantities of 5-80% by weight; or
  f) blends of any two or more of the polymers or compositions of items a) to e).

17. The thermoplastic polyolefin compound of claim 13, further comprising any one or more additives selected from fillers, processing aids, lubricants, stabilizers, pigments, antioxidants, plasticizers, antistatic agents, recycled polyolefin materials, or any combinations thereof.

* * * * *

UNITED STATES PATENT AND TRADEMARK OFFICE
CERTIFICATE OF CORRECTION

| | | |
|---|---|---|
| PATENT NO. | : 10,723,049 B2 | Page 1 of 1 |
| APPLICATION NO. | : 15/648816 | |
| DATED | : July 28, 2020 | |
| INVENTOR(S) | : Kramb et al. | |

It is certified that error appears in the above-identified patent and that said Letters Patent is hereby corrected as shown below:

In the Specification

In Column 13, Line 2, delete "(Adlex™ Q100F)" and insert -- (Adflex™ Q100F) --, therefor
In Column 14, Line 52, delete "Adlex™ Q100F" and insert -- Adflex™ Q100F --, therefor Signed and Sealed this
Third Day of January, 2023

Katherine Kelly Vidal
*Director of the United States Patent and Trademark Office*